United States Patent [19]

Gram

[11] 4,054,077

[45] Oct. 18, 1977

[54] GUIDE FOR HAND HELD POWER SAWS

[76] Inventor: Reginald Henry Gram, 29 Scarboro Ave., West Hill, Ontario, Canada

[21] Appl. No.: 561,243

[22] Filed: Mar. 24, 1975

[51] Int. Cl.² .............................................. B27B 9/04
[52] U.S. Cl. ........................................ 83/745; 83/574
[58] Field of Search ...................... 83/745, 743, 471.2, 83/471.3, 477.2, 477.1, 574, 486

[56] References Cited

U.S. PATENT DOCUMENTS

| 2,634,767 | 4/1953 | Chappell | 83/745 |
| 2,926,706 | 3/1960 | Hopla | 83/745 |
| 3,124,175 | 3/1964 | McCloud | 83/745 |
| 3,320,982 | 5/1967 | Kwiatkowski | 83/574 |
| 3,516,457 | 6/1970 | Winters | 83/745 |
| 3,830,130 | 8/1974 | Moore | 83/745 |

Primary Examiner—Donald R. Schran

[57] ABSTRACT

A saw guide for use with a hand held power saw comprises in combination, a base plate having a generally planar edge, a saw blade index which is connected to a side of the base plate and which projects beyond and outwardly of the generally planar edge. The saw blade index has a generally planar first edge extending along the length thereof. The planes of the generally planar edges of the base plate and the saw blade index intersect one another at an angle of 90° or less. The arrangement is such that a workpiece to be cut is placed along the generally planar first edge of the saw blade index and against the side of the base plate where the side of the base plate is held in the face-down position to sandwich the workpiece between the saw guide and a workbench surface. The angle between the planes determines the angle at which the workpiece is cut with the hand held power saw.

10 Claims, 7 Drawing Figures

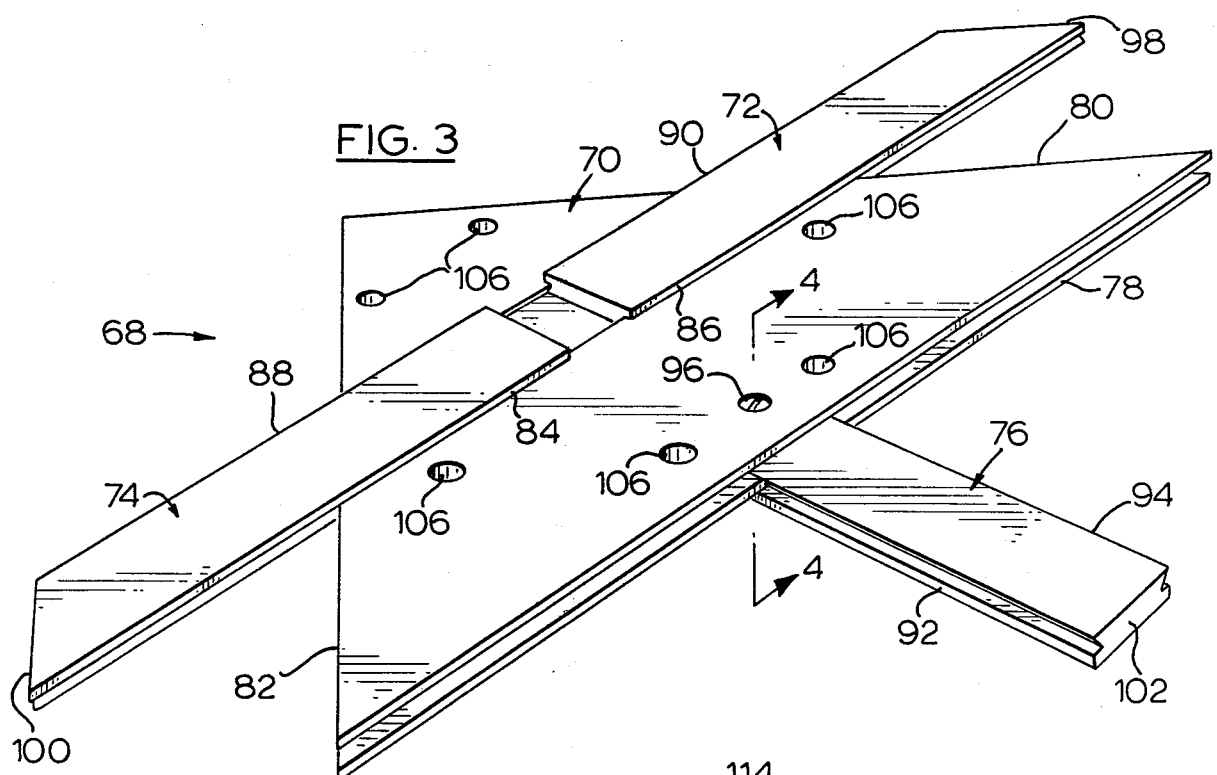
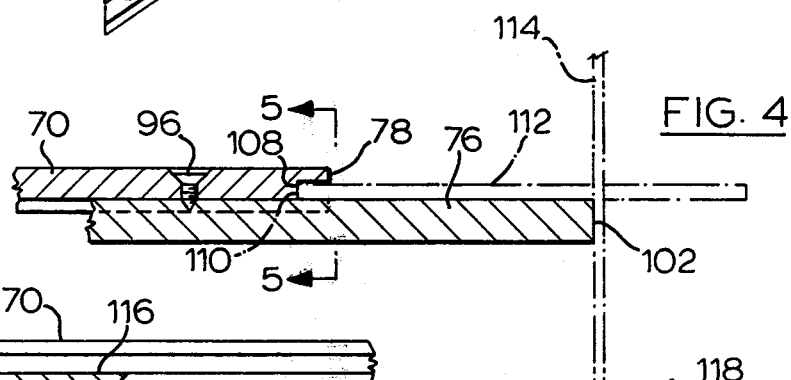
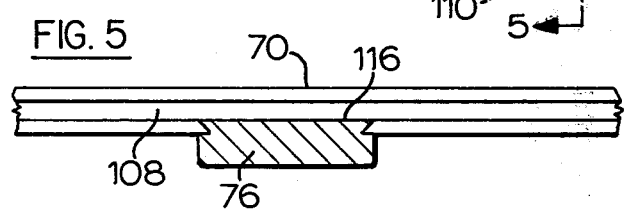
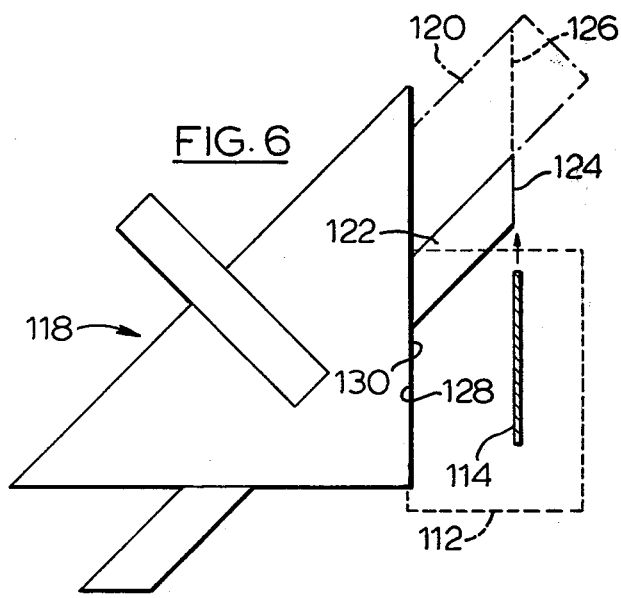
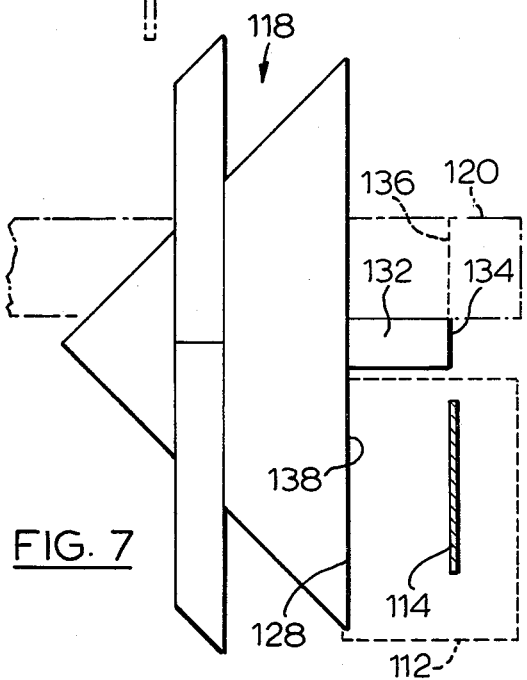

GUIDE FOR HAND HELD POWER SAWS

FIELD OF INVENTION

This invention relates to a saw guide which is useful for guiding hand held power saws in making various angular cuts in a workpiece.

BACKGROUND OF THE INVENTION

A well-known difficulty encountered in guiding a hand held power saw when cutting wood and metal is holding the saw so that an accurate smooth cut is made in the piece of work. It is particularly difficult to form miter joints for use in picture frames and the like with a hand held power saw because of the problem in accurately guiding the saw by hand.

It is therefore an object of the invention to provide a saw guide for use with hand held power saws which assists in making an accurate smooth cut at a desired location in a piece of work.

It is further object of the invention to provide a saw guide which may be used with a hand held power saw to cut a piece of work accurately at any desired angle.

It is another object of the invention to provide a saw guide having a saw blade index which accurately indicates the location of the saw blade of the hand held power saw relative to the guiding edge of the saw guide.

It is yet another object of the invention to provide saw blade indexes on the saw guide which are movable inwardly and outwardly relative to the guiding edge of the saw guide to permit adjustment to different pitches of saw blades and different makes of hand held power saws.

It is a further object of the invention to provide a base plate for use with a saw guide as described herein.

It is yet a further object of the invention to provide means on the saw guide for retaining a hand held power saw in a level position during the cutting operation.

SUMMARY OF THE INVENTION

A saw guide according to this invention may be used with any type of hand held power saw, for example, a power saw having a rotary or reciprocating saw blade. The saw guide comprises in combination a base plate having a generally planar edge and a saw blade index which is connected to a side of the base plate and which projects beyond and outwardly of the generally planar edge of the base plate. The saw blade index has a generally planar first edge extending along the length thereof. The planes of the generally planar edges of the base plate and the saw blade index intersect one another, an angle of 90° or less being defined between the intersecting planes. The arrangement is such that the work to be cut is placed along the generally planar first edge of the saw blade index and against the side of the base plate which is connected to the index. The work is then cut at an angle determined by the angle between the intersecting planes of the planar edges as a hand held power saw is used with the saw guide.

The saw blade index may be provided with a generally planar second edge which indicates the exact location of a saw blade of a hand held power saw relative to the generally planar edge of the base plate subsequent to the saw guide having been used with a hand held power saw.

The base plate of the saw guide may be triangular shaped. A first saw blade index is mounted on one side of the triangular shaped body portion and extends beyond and outwardly of two sides of the triangle. A second saw blade index may be provided on the other side of the triangular shaped body portion and extending beyond the third and remaining side of the triangle.

The saw guide may be provided with means for temporarily securing the saw guide relative to a workbench top to permit sandwiching of the work between the guide and the workbench top to ensure an accurate cut of the work.

The saw guide may be manufactured from wood, metal or plastic material.

BRIEF DESCRIPTION OF THE DRAWINGS

These and other objects, advantages and features of the invention will become apparent in the detailed description of the preferred embodiments of the invention which are shown in the drawings wherein:

FIG. 3 is a perspective view of another embodiment of the saw guide according to this invention;

FIG. 4 is a partial section of the saw guide shown in FIG. 3 along the lines 4—4;

FIG. 5 is a partial section of the saw guide section in FIG. 4 along the lines 5—5; and FIGS. 6 and 7 show the use of a saw guide in accordance with this invention with a hand held power saw.

DETAILED DESCRIPTION OF THE PREFERRED EMBODIMENTS

Figure 1:
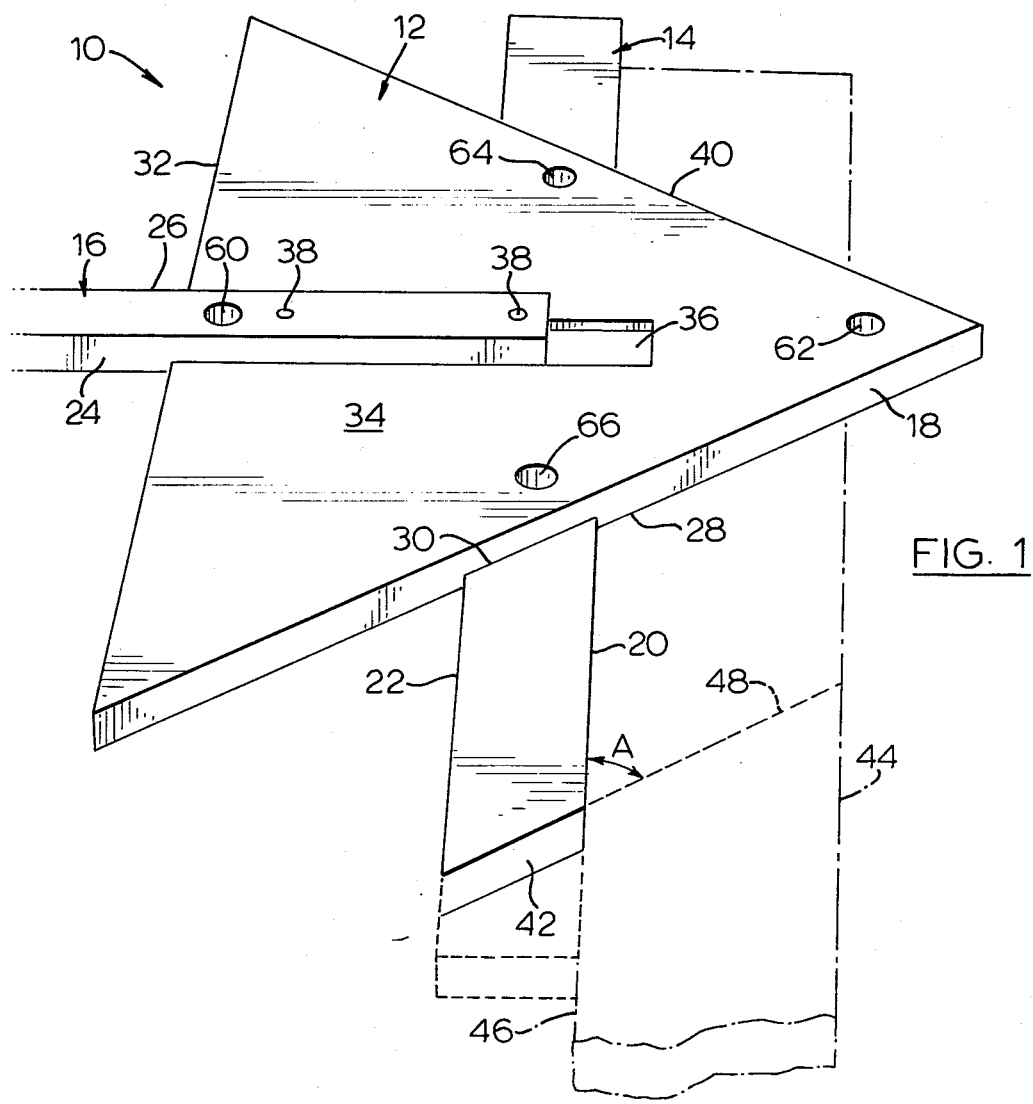
FIG. 1 is a perspective view of a saw guide in accordance with this invention as it is placed over a workpiece.

Referring to FIG. 1 of the drawings, a preferred arrangement of the saw guide of the invention is shown. The saw guide 10 comprises in combination a triangular shaped base plate 12 and two saw blade indexes 14 and 16. The base plate 12 has three generally planar edges 18, 32 and 40 which define the periphery of the triangular shaped body portion of the base plate 12. Each of the planar edges provides a guiding edge for a hand held power saw which is used with the saw guide 10.

The saw blade index 14 has two generally planar and parallel first edges 20 and 22. Similarly, saw blade index 16 has two generally planar and parallel first edges 24 and 26. The elongate saw blade index 14 is connected to the underside 28 of base plate and mounted in a channel 30 which is adapted to receive the saw blade index 14. Generally planar first edges 20 and 22 are parallel to edge 32 of the base plate 12. Saw blade index 16 is connected to the upper side 34 of the base plate and mounted in channel 36 by screws 38. The generally planar first edges 24 and 26 of saw blade index 16 are perpendicular to edge 32 of base plate 12.

Although with the preferred embodiment shown in FIG. 1 the base plate 12 is triangular shaped, it is understood that a single guiding planar edge may be provided where the base plate 12 is shaped to present a single generally planar edge and have attached to a side thereof, a saw blade index extending beyond and outwardly from the generally planar edge. With the embodiment shown, a preferred shape for the base plate 12 is a right angle isosceles triangle where edges 18 and 40 are of equal length and edge 32 is the hypotenuse of the triangle.

A hand held power saw of the circular saw, jig saw or the like are usually provided with a platform. An edge of the platform contacts a guiding generally planar edge of the saw guide to guide the saw cut in the manner shown in FIGS. 6 and 7 which will be discussed in more detail hereinafter. The saw guide 10 is shown as it may be manufactured with the saw blade indexes 14 and 16 projecting substantially beyond the respective planar edges of the base plate 12. Once it is desired to use the saw guide 10, the saw blade indexes may be cut to indicate the position of the saw blade relative to the respective planar edge of the base plate 12 by using a hand held power saw with the guide.

Referring to FIG. 1, the saw blade index 14 is cut by passing a hand held power saw along generally planar edge 18 to cut the saw blade index 14 to form a generally planar second edge 42. The second generally planar edge is parallel to the generally planar edge 18. The distance between the generally planar second edge 42 and the edge 18 indicates the distance between the saw blade and the generally planar edge 18.

When it is desired to cut a piece of work 44 which is shown in FIG. 1, the generally planar first edge 20 is placed up against edge 46 of the workpiece 44 and the underside 28 of the base plate 12 is placed on top of the workpiece 44. The generally planar second edge 42 of the saw blade index is located at dotted line 48, which is the desired line of cut. A hand held power saw, guided by the saw guide edge 18, is passed therealong to cut the workpiece along dotted line 48 because the same power saw has been used with saw guide 10 to form the second edge 42 of the saw blade index.

The angle defined between the intersecting planes of edges 22 and 18 defines the angle A at which the workpiece 44 is cut. In this particular embodiment, the base plate 12 is a right angle isosceles triangle and with the saw blade index 14 positioned as shown in FIG. 1 of the drawing, angle A equals 45°.

Figure 2:
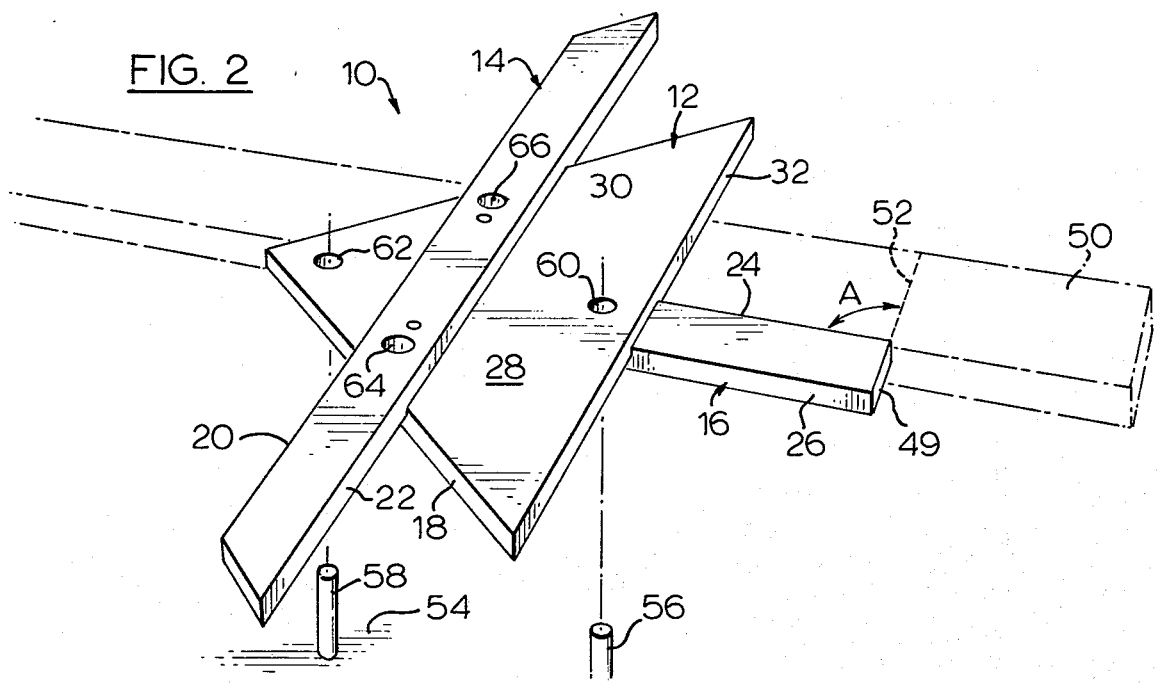
FIG. 2 is an exploded view of the saw guide as raised form a workbench top having pins for mounting the saw guide.

In FIG. 2, the saw guide 10 is shown with a workpiece 50 positioned along edge 24 of saw blade index 16. A hand held power saw is guided by edge 32 to make a cut along dotted line 52 where angle A equals 90°. Saw blade index 16 is provided with a generally planar second edge 49 which has been formed by using a hand held power saw with the guide 10 to accurately indicate the location of the saw blade relative to guide edge 32.

To ensure an accurate cut along line 52, the workpiece 50 may be sandwiched between a bench top 54 having upwardly extending pins 56 and 58. Holes 60 and 62 are provided along the longitudinal axis of the saw blade index 16 and are spaced apart a distance adapted to receive pins 58 and 56. By holding the base plate 12 with the palm of the hand, the workpiece 50 is sandwiched between the top 54 of the workbench and the side 34 of the base plate 12 to firmly hold the workpiece as a hand held power saw is guided by edge 32 to make a cut along line 52.

Similarly, with the cut along line 48 of FIG. 1, holes 64 and 66 are provided which are also adapted to receive pins 58 and 56 to secure the workpiece 44 to make an accurate cut along dotted line 48.

Another preferred embodiment 68 of a saw guide is shown in FIG. 3. It comprises a triangular shaped base plate 70 and movable first saw blade indexes 72 and 74 and a movable second saw blade index 76. Edges 78, 80 and 82 of the base plate 70 define a right angle isosceles triangle. The generally planar first edges 84 and 86 of indexes 72 and 74 lie in the same plane and are parallel to edge 78 which constitutes the hypotenuse of the triangle. Generally planar first edges 88 and 90 of the saw blade indexes 74 and 72 are parallel to edges 84 and 86. Second saw blade index 76 has generally planar first edges 92 and 94 which are perpendicular to edge 78.

Screws 96 secure the movable first and second saw blade indexes in the desired position. Saw blade indexes 72, 74 and 76 are provided with second generally planar edges 98, 100 and 102, respectively which have been adapted as discussed hereinabove to indicate the location of the saw blade relative to the respective generally planar edge of the base plate 70. The saw blade indexes are permitted to move inwardly and outwardly to adjust to the position of the new saw blade which may have a different pitch or to the use of a different type of hand held power saw. Because the saw blade indexes are movable, holes for receiving pins 58 and 56 of a workbench top 54 are offset from the longitudinal axis of the saw blade indexes. The holes are generally designated at 106.

As shown in FIG. 4, screw 96 when turned down secures the positioning of the saw blade index 76 relative to the base plate 70. Edge 78 of the base plate 70 is provided with a groove 108 which is adapted to receive an edge 110 of a platform 112 of a hand held power saw. A saw blade 114 is shown as it passes by planar edge 102 of the saw blade index 76. Groove 108 as it receives an edge of the platform 112 assists during the cutting operation to maintain the platform 110 in a level position to ensure an accurate cut along the workpiece.

To permit the inward and outward movement of the saw blade index as shown in FIG. 5, index 76 is mounted in tongue and groove manner in a channel of the base plate 70. Groove 108 is positioned above the upper surface 116 of the saw blade index 76 to permit an edge 110 of a platform 112 of a power saw to pass over top of the saw blade index 76.

The saw guide of the invention is shown as being used with a hand held power saw in FIGS. 6 and 7 to form the various desired cuts in the workpiece. According to FIG. 6, a saw guide 118 is placed over a workpiece 120. The saw blade index 122 has its second planar edge 124 aligned with the desired line of cut, dotted line 126. The edge 128 of a power saw platform is guided by edge 130 of the saw guide 118 to form the desired 45° cut in workpiece 120 at the accurate location of dotted line 126.

Similarly, to form a right angle cut in a workpiece 120 as shown in FIG. 7 the saw blade index 132 has its planar edge 134 aligned with the desired line of cut, dotted line 136. Power saw platform edge 128 is guided by edge 138 of the saw guide 118 to form the accurate cut in the workpiece 120 along dotted line 136.

With the saw guide as shown in FIG. 1 where the saw blade indexes are secured to the base plate, it is understood that plastic wood or similar filler material may be added to the generally planar second edges of the saw blade indexes to relocate the generally planar second edge when a new saw blade is used having a different pitch than the saw blade of a hand held power saw used previously with the saw guide.

As mentioned, the saw guide may be made from wood, metal or plastic materials, it being understood that the base plate of the saw guide may have hollow portions formed therein when the guide is manufactured from a metal or plastic material.

With the triangular saw guide shown in the drawings and having two saw blade indices, 45° cuts on both sides of the workpiece may be accomplished by running the saw along the respective edges of the guide and adjusting the workpiece accordingly. At the same time, the saw guide can be used to provide a 90° cut in the manner shown in FIGS. 2 and 7.

It is understood that when other angles of cuts are desired, indexes can be repositioned as would be apparent to those skilled in the art to form the desired angle between the intersecting planes of the first planar edges of the saw blade index and the respective generally planar edge of the base plate.

When the saw blade indexes of the saw guide become damaged and require replacement, it is understood that the channels formed in the base plate of the saw guide are of a dimension adapted to receive standard sizes of wood so that the consumer after having purchased the saw guide may replace the saw blade indexes without difficulty. It is also understood that replacement base plates for the saw guide may also be provided.

Although various preferred embodiments of the invention have been discussed herein in detail, it is understood that variations may be made thereto as will be understood by those skilled in the art without departing from the spirit of the invention or the scope of the appended claims.

The embodiments of the invention in which an exclusive property or privilege is claimed are defined as follows:

1. A saw guide for use with a hand held power saw comprising in combination a base plate having a triangular shaped body portion each edge thereof being generally planar, and two first saw blade indexes which are connected to a side of said base plate and which project beyond and outwardly of two generally planar edges of said triangular shaped body portion and a second saw blade index which is connected to the other side of said base plate and which projects beyond and outwardly of the remaining generally planar edge of said triangular shaped body portion; each said saw blade index having a generally planar first edge extending along the length thereof, the plane of each generally planar first edge intersecting the plane of the respective generally planar edge of said triangular shaped body portion, an angle of 90° being defined between the intersecting planes of the generally planar first edge of said second saw blade index and the respective generally planar edge of the triangular shaped body portion, an angle of less than 90° being defined between the intersecting planes of each generally planar first edge of each first saw blade index and the respective generally planar edge of the triangular shaped body portion; the arrangement being such that a workpiece to be cut is placed along the generally planar first edge of a selected one of said first or second saw blade indexes and against the corresponding side of said triangular shaped body portion, the angle defined between intersecting planes which correspond to the selected saw blade index determining the angle at which a workpiece is cut with a hand held power saw.

2. A saw guide of claim 1 wherein said two first saw blade indexes are integrally formed as an elongate saw blade index member, the generally planar first edge extending continuously along said elongate saw blade index member, each end of said elongate saw blade index member projecting beyond and outwardly of the corresponding generally planar edges of said triangular shaped body portion.

3. A saw guide of claim 1 wherein each of said first and second saw blade indexes has a generally planar second edge at the outer extent thereof which intersects the generally planar first edge of the respective saw blade index, each generally planar second edge being parallel to the corresponding generally planar edge of said triangular shaped body portion and indicating the exact location of a saw blade of a hand held power saw relative to said corresponding generally planar edge of said triangular shaped body portion subsequent to said saw guide having been used with a hand held power saw.

4. A saw guide of claim 1 wherein the periphery of said triangular shaped body portion defines a right angle isosceles triangle.

5. A saw guide of claim 2 wherein the periphery of said triangular shaped body portion defines a right angle isosceles triangle, said elongate saw blade index member extending beyond and outwardly of the generally planar edges of the equal sides of said triangle, said second saw blade index extending beyond and outwardly of the generally planar edge of the hypotenuse of said triangle.

6. A saw guide of claim 5 wherein the longitudinal axis of said elongate saw blade index member is parallel to the generally planar edge of the hypotenuse of said triangle and perpendicular to the longitudinal axis of said second saw blade index.

7. A saw guide of claim 1 wherein each of said first and second saw blade indexes is slidably connected to a corresponding side of said triangular shaped body portion, each said saw blade index being movable inwardly and outwardly relative to the corresponding generally planar edge of said triangular shaped body portion.

8. A saw guide of claim 7 wherein means is provided which releasably secures each saw blade index.

9. A saw guide of claim 1 wherein each generally planar edge of said triangular shaped body portion is provided with a groove along the length thereof adapted to receive a longitudinal edge of a platform of a hand held power saw used with said saw guide.

10. A saw guide of claim 6 wherein a set of two spaced-apart holes is provided along and parallel to the longitudinal axis of said elongate saw blade index member and along and parallel to the longitudinal axis of said second saw blade index, each set of holes being spaced apart an equal distance and adapted to receive two correspondingly spaced-apart pins which project upwardly from a bench top, the arrangement being such that a piece of work to be sawed is sandwiched between the side of said triangular shaped body portion which is connected to the respective saw blade index being used and a bench top having two spaced-apart pins.

* * * * *